Figure 1:
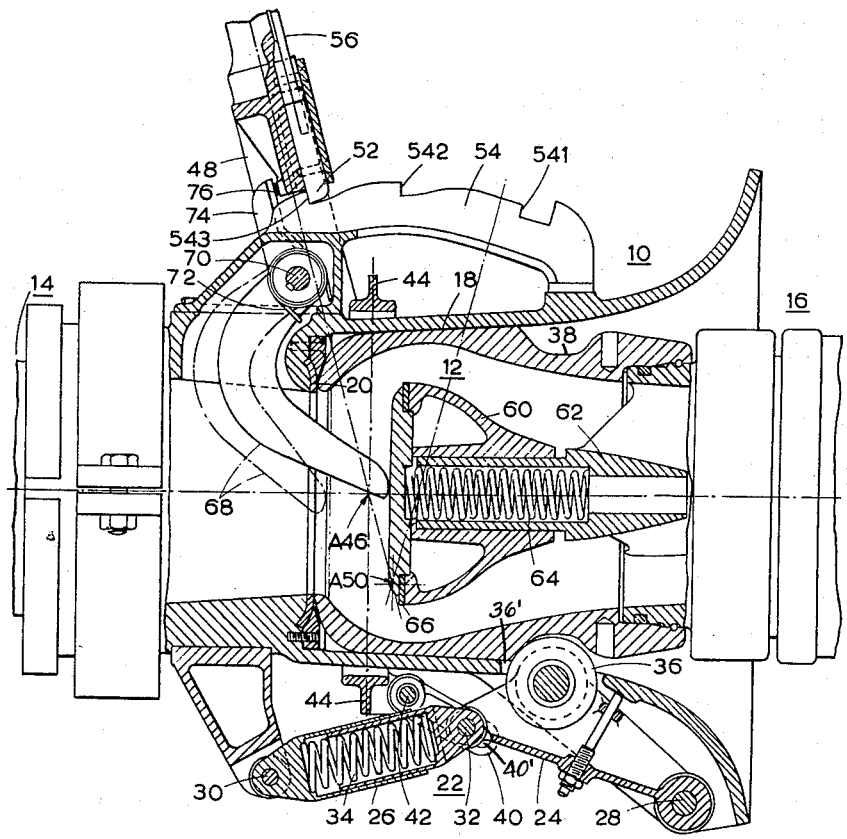

Sept. 15, 1959

C. A. GELLETT ET AL 2,904,351

PIPE-COUPLING DEVICES

Filed Jan. 31, 1957

3 Sheets-Sheet 1

Charles A. Gellett
Peter S. Macgregor
INVENTORS by Watson, Cole, Grindle &
Watson
ATTORNEYS Sept. 15, 1959 C. A. GELLETT ET AL 2,904,351
PIPE-COUPLING DEVICES
Filed Jan. 31, 1957 3 Sheets-Sheet 2

Charles A. Gellett
Peter S. Macgregor
INVENTORS
by Watson, Cole, Grindle & Watson
ATTORNEYS United States Patent Office 2,904,351
Patented Sept. 15, 1959

2,904,351

PIPE-COUPLING DEVICES

Charles Alfred Gellett, Broadstone, and Peter Stevens Macgregor, Moorlands Crescent, Upton, Poole, England, assignors to Flight Refueling Incorporated, Danbury, Conn., a corporation of Delaware Application January 31, 1957, Serial No. 637,543

Claims priority, application Great Britain January 31, 1956

11 Claims. (Cl. 284—19)

This invention relates to plug and socket type pipe-coupling devices having latching means, and more especially such as are intended for heavy duty.

In its broadest aspect, the present invention has for its principal object the provision of a fluid coupling installation wherein a socket member is adapted to receive a plug or nozzle member the latter containing a valve controlling the flow therethrough and the socket member carrying manually actuatable means for opening and closing the valve in the nozzle member. Somewhat more narrowly considered, the invention has for its object the provision of means for common actuation of this valve and actuation of latches for retaining the socket and nozzle members in coupled relationship. The latching means employed may be, according to the broadest aspect of the invention, either one which is ultimately yieldable upon the application of great stress or one which effects a fixed unyielding coupling.

The invention, in its narrower aspect, aims at meeting a demand for a pipe-coupling of this kind in which the latching means will hold the coupling members coupled together against a heavy pull tending to separate them, but will ultimately yield and allow the coupling members to part under an extremely heavy pull, while insertion of the plug member in the socket member of the coupling can be effected rapidly and easily by hand, without use of excessive force in causing the latching means to yield, and in which the latching means can be positively and quickly released for disconnecting the coupling.

A further requirement this invention aims to meet is that the plug member of the coupling should be effectively sealed at all times except when fully inserted in the socket member with the latching means fully engaged.

According to this invention, the socket member of a plug and socket type pipe-coupling assembly carries elements adapted to engage a recess or recesses, preferably an annular groove, in a nozzle-like plug member of the assembly, a movable member having connections with said elements adapted to limit variably the depth of engagement of the elements in the recess or recesses, and means being provided for selectively locating the movable member in three positions, such that in the first such position the said elements do not engage the recess(es), in the second and third such positions the engagement of the elements in said recess(es) is partial and complete respectively.

Preferably, the said elements are carried by spring-loaded toggle linkages connected to said movable member by lost-motion connections, allowing said elements to be sprung radially outwards.

Preferably also, the said movable member is actuated, for movement axially of the socket member, by a control lever pivoted on the socket member and having a spring-loaded pawl engageable with any one of three notches in a ratchet mounted on the socket member.

The plug member of the pipe-coupling may comprise a normally closed, spring-loaded valve, the socket member being provided with a movable valve-opening member, which is movable by the control lever so as to open the valve when the control lever is moved from the second to the third of the abovementioned positions.

In one form of construction of the pipe-coupling assembly as above described, the toggle-linkages each comprise a lever, which is pivoted on the socket member for movement radially thereof and carries a roller engageable with the groove of the plug member, and a telescopic link extendable by a spring or springs and pivoted at one end on the socket member for movement radially thereof and pivotally connected at its other end to the roller-carrying lever, and the said movable member is constituted by a ring surrounding the socket member, to which ring are pivoted, for movement radially thereof, links having pin and slot connections with the toggle-linkages, said ring being pivotally connected to the control lever. In this form of construction, the valve of the plug member is of the poppet type and seats on a seating in the mouth of the nozzle-like plug-member, being unseatable against its spring-loading by being pushed inwards by a finger inside the socket member, said finger being pivotally mounted in the socket member and having an external lever fast therewith which is engageable by the control lever when moved from the second to the third of the three above-mentioned positions, which are defined by a pawl on the control lever engageable with a ratchet having three notches.

Normally, the plug member, sealed by its valve, will carry fluid under pressure when inserted into the socket member, the interior of which will be at atmospheric pressure. Consequently, the valve of the plug member would have to be unseated against the back-pressure of fluid behind it, which might call for excessive manual effort on the control lever when moving it from the second to the third of the positions above-mentioned. To overcome this disadvantage, a modified form of construction of the invention includes a pressure-relief valve member mounted in the main valve member of the plug member and seatable on an opening in the face of the main valve member of much smaller area than that of the main valve seating, such opening communicating with the interior of the plug member. In this modified form of construction the relief valve member is also seatable by spring means, preferably the same spring means as seats the main valve member, and the valve-opening member of the socket member is operative first to unseat the relief valve member, which can be effected with reduced effort owing to the relatively small area of the relief valve seating, thereby equalising the pressures on either side of the main valve, and thereafter unseat the main valve member.

Figure 2:
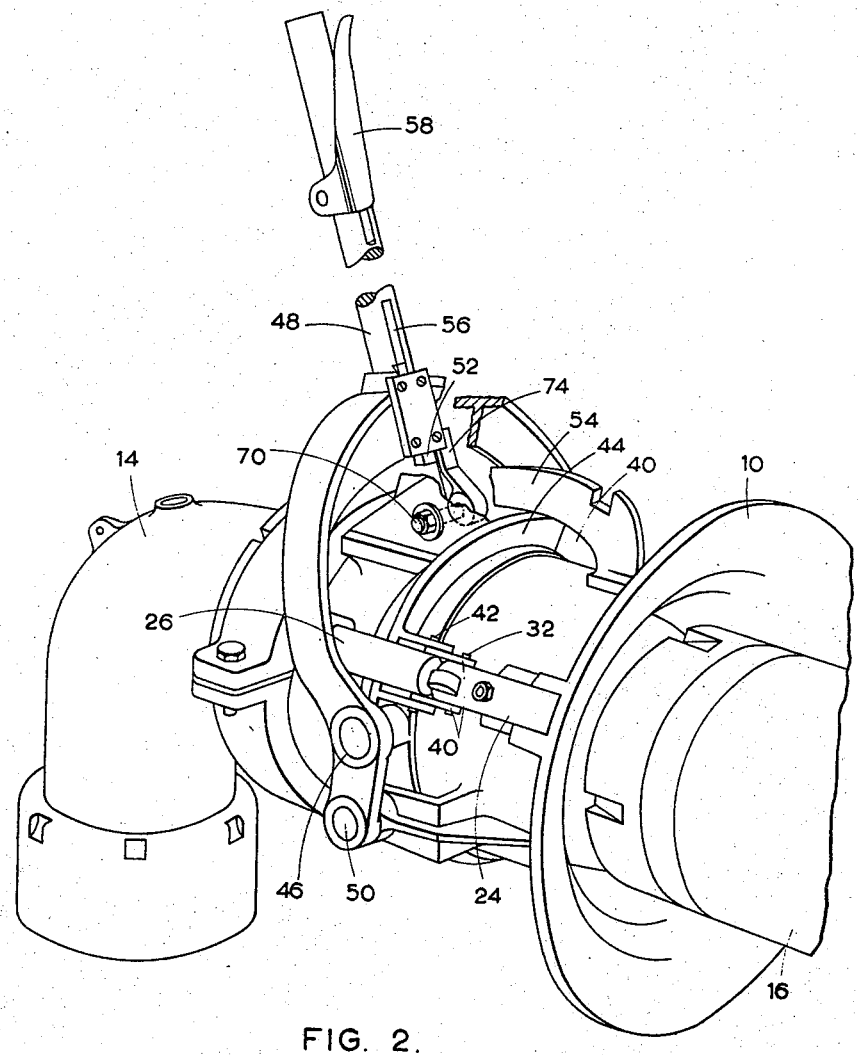
Figure 3:
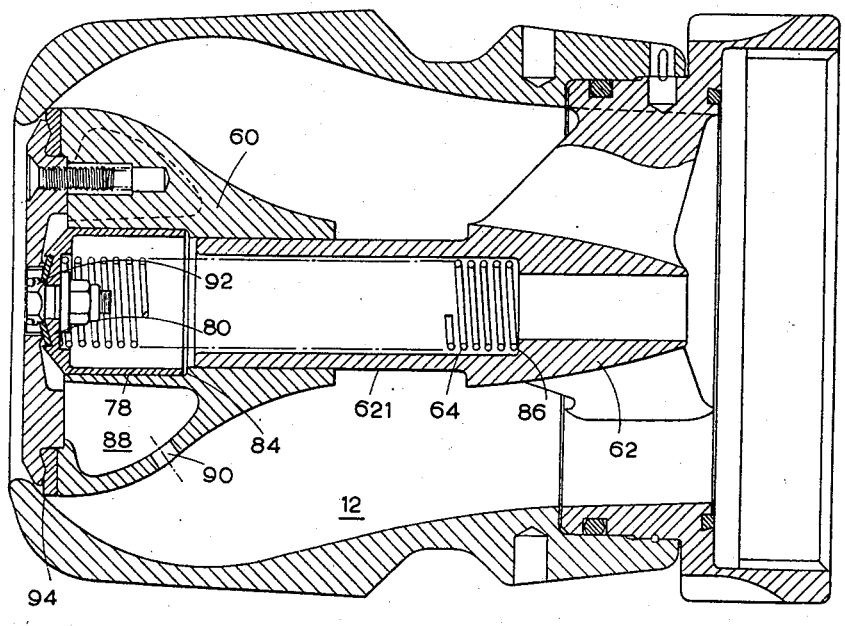

How the foregoing objects and features of the invention may be carried into practice, together with such other objects and features as may hereinafter appear, will be more readily understood from the following description, having reference to the accompanying drawings, of an embodiment of the invention and a modification thereof, given by way of example only, and without implied limitation of the scope of the invention, which is defined in the hereto appended claims:

In the drawings:

Figure 1 is an axial section of the complete coupling assembly partly in elevation in the coupled condition; and Figure 2 is a perspective view of the same, partly broken away, on a reduced scale; and Figure 3 is an axial section of the plug member of the coupling illustrating a modification.

In the pipe-coupling assembly illustrated in the drawings, 10 is the socket member and 12 the plug member or nozzle, the former being connected to a fixed pipe 14 and the latter to a flexible hose 16. The nozzle and socket are shown in Figure 1 in the coupled position in which their mating tapers 18 fit together and the tip of the nozzle seals against a flexible sealing ring 20 mounted in the socket.

The socket carries three toggle linkages 22, each of which comprises a rigid link 24 and a telescopic link 26. Links 24 and 26 are pivotally mounted on the socket for movement radially thereof on pivot pins 28, 30 respectively, and are pivotally connected to one another by a toggle-joint pin 32. The telescopic link 26 is extended by springs 34 and the rigid link 24 carries a toggle roller 36, which, in the position shown in Figure 1, engages in an annular groove 38 formed in the nozzle 12, the wall of the socket 10 having openings 36' through which the rollers 36 penetrate. Links 40, pivotally connected for movement radially of the socket to a ring 44 by means of pivot pins 42, have lost motion, pin and slot connections with the toggle-linkages 22 whose joint pins 32 engage in longitudinal slots 40' formed in the links 40. Ring 44 loosely surrounds the socket 10 and has trunnions 46 by which it is connected to a yoke lever 48, which is pivotally mounted on the socket 10 by means of trunnions 50 and terminates in an operating handle (see also Figure 2) the axes of trunnions 46 and 50 being indicated in Figure 1 at A46 and A50 respectively. Lever 48 carries a spring-loaded pawl 52 engageable with a ratchet 54 fixed on the socket and having three notches 541, 542, 543. The pawl 52 is releasable by means of a rod 56 and hand lever 58 (Figure 2).

Within the nozzle 12 a mushroom-type valve 60 is slidably supported for movement axially of the nozzle on a spider 62 and having a sealing ring 66 which is normally caused to seat on the inside of the mouth of the nozzle by means of a valve loading spring 64 housed in spider 62. Valve 60 is unseatable against the effort of spring 64 by means of a finger 68 mounted inside the socket 10 on a rocking shaft 70 which also extends outside the socket and carries an external lever 74 engageable by a stud 76 on lever 48 when the latter is moved from the position defined by ratchet-notch 542 to that defined by ratchet-notch 543 and indicated in full lines in Figure 1.

Movement of the lever 48 in the clockwise sense, as seen in Figure 1, shifts the ring 44 towards the right, as seen in that figure, and causes the slotted links 40, by their engagement with the toggle joint pins 32, progressively to limit the degree of penetration of the toggle rollers 36 through the openings in the wall of the socket member 10 under the efforts of the toggle springs 34. When the lever 48 is in the position shown in Figure 1, the toggle rollers 36 can penetrate the wall of the socket member far enough to engage fully in the nozzle groove 38. In this position the toggle-linkages will resist a heavy pull tending to separate the nozzle from the socket, but the pin and slot connection between links 40 and the toggle joint pins 32 will allow the toggle-linkages to yield under a very heavy pull exceeding an upper critical value and allow the nozzle to be pulled out of the socket.

When the lever is moved to the second position in which its pawl 52 engages the ratchet-notch 542, the penetration of the rollers 36 through the wall of the socket member is limited so that the rollers can only engage the groove 38 partially and in this position the toggle-linkages offer relatively small resistance to the insertion of the nozzle in the socket.

When the lever 48 is moved to the third position in which its pawl 52 engages ratchet-notch 541, the penetration of the rollers 36 is still further limited so that they cannot engage the groove 38 at all, thus freeing the nozzle 12 for withdrawal from the socket 10.

The operating procedure is as follows:

When it is desired to insert the nozzle in the socket the lever 48 is placed in the second position with its pawl 52 engaged with ratchet-notch 542. The nozzle is then pushed into the socket in which movement it springs the toggle-linkages 22 back slightly until the toggle rollers can engage lightly in the groove 38. With the nozzle in this position the valve 60 is still seated on the inside of the mouth of the nozzle by its spring 64. The lever 48 is then brought into first position as shown in Figure 1. In this movement the lever 48 withdraws the ring 44 to the left (as seen in Figure 1) thus enabling the toggle rollers 36 to engage fully in the groove 38 and in so doing to cause the tip of the nozzle 12 to seal firmly against the flexible sealing ring 20. This movement of the lever 48 further causes the stud 76 to engage the external lever 74 and rock it together with the shaft 70 counterclockwise against the effort of spring 72 so as to move the finger 68 from the chain-dotted position to the full-line position indicated in Figure 1 and unseat the valve 60 against the effort of spring 64.

The coupling assembly is now fully coupled and sealed and its interior is open for the passage of fluid from the pipe 14 to the pipe 16, or conversely.

In this position the coupling assembly is firmly locked against all normal loads tending to separate its members, but these members will automatically be pulled apart if subjected to a pull tending to separate them exceeding the critical value above-mentioned. If this occurs, the valve 60 will automatically be seated by its spring 64 as the nozzle pulls out of the socket. To release the nozzle from the socket after the transfer of fluid from one pipe to the other has been completed, the lever 48 is moved to the third position with its pawl 52 engaged in the ratchet-notch 541. In the first part of this movement the spring 72 returns finger 68 to the chain-dotted position, thus allowing spring 64 to seat the valve 60 and seal the mouth of the nozzle; and in the final part of the movement the ring 44 is shifted to the right (as seen in Figure 1) far enough to withdraw the toggle rollers 36 completely from the groove 38, whereupon the nozzle can be extracted from the socket freely. It is to be observed that the withdrawal of finger 68, and consequent seating of the valve 60, is completed before the lever 48 reaches the second position defined by notch 542, in which position the toggle rollers 36 are still partially engaged in the groove 38 retaining the nozzle 12 in the socket 10, thus ensuring that the nozzle cannot be completely freed for extraction from the socket until the valve 60 is firmly seated.

In the modification illustrated in Figure 3, the valve 60 of the nozzle includes a pressure-relief valve 78 slidable in valve 60 and seatable on a seating 80 formed on the rim of a central opening in the face of valve 60. Valve 60 is axially bored to slide on an axial extension 621 of spider 62 and relief valve 78 slides in an enlargement of the bore of valve 60 terminating rearwardly (to the right in the Figure) at a shoulder 84, between which and the trailing end of relief valve 78 there is a small clearance when relief valve 78 is seated. Spring 64 is trapped between the head of relief valve 78 and a shoulder 86 in the axial bore of spider 62. The opening in the face of valve 60 communicates, when not sealed by the relief valve, with a chamber 88 in the head of the valve 60, which chamber communicates with the interior of the nozzle through a vent 90. The relief valve 78 has a central boss 92 which enters the opening of the face of valve 60 and lies substantially flush with said face when the relief valve is seated.

When the lever 48 is moved to the first position to engage the pawl 52 with the ratchet-notch 543 and thereby move the finger 68 to the full-line position of Figure 1, as previously explained, finger 68 engages the boss 92 of the relief valve 78 and first unseats the latter, thus putting the interior of the nozzle 12 into communication with the interior of the socket member 10 (Figure 1) through the vent 90, chamber 88 and the opening in the face of valve 60, and thereby equalising the pressure difference across the valve 60. Further movement of finger 68 causes the relief valve 78 to meet shoulder 84 and unseat valve 60.

Owing to the relatively small area of the seating 80 compared with that of the seating 94 of valve 60 on the inside of the mouth of the nozzle, the force required to unseat the relief valve 78, against the initial pressure difference between the interior of the nozzle and interior of the socket member, it being assumed that the nozzle is loaded with fluid under pressure and the socket member is at atmospheric pressure, is much less than that required to unseat the main valve 60 against the same pressure difference; and consequently the effort that must be applied to the lever 48 in order to unseat valve 60 is much reduced.

We claim:

1. A quick-detachable pipe coupling assembly of the plug and socket type comprising a socket member and a plug member, which plug member comprises a nozzle adapted to be received within said socket member, means releasably connecting said members when said nozzle is so received within said socket member, a valve in said nozzle movable therein to and from flow-opening and flow-closing positions, an actuating element for said valve, means pivotally supporting said actuating element within said socket member, a portion of said actuating element adapted to be swung into the mouth of said nozzle element and contact and actuate the valve therein, a hand lever pivoted exteriorly of said socket member and operatively connected with said pivoted actuating element to cause it to open or close the valve at will.

2. A pipe coupling assembly of the plug and socket type comprising a socket member and a plug member, which plug member comprises a nozzle adapted to be received within said socket member, latching means included in said coupling assembly actuatable to and from nozzle and socket connecting and release positions respectively, a valve in said nozzle member, means supporting said valve for movement to and from flow-opening and flow-closing positions when said socket member and said nozzle are completely coupled, means movably mounted with respect to said socket member for opening or closing said valve, means for moving said latching means to and from connecting and releasing positions, and a common actuating lever adjustably pivoted exteriorly of said socket member and operatively connected with both the means for moving said latching means and the means for opening and closing the valve.

3. A pipe coupling assembly of the plug and socket type comprising a socket member and a plug member comprising a nozzle adapted to be received within said socket member, latching means included in said coupling assembly actuatable to and from nozzle and socket connecting and release positions respectively, a valve in said nozzle member movable therein to and from flow-opening and flow-closing positions, a common actuating element for said latching means and said valve, means for retaining said common actuating element in any one of three selected positions, means operatively connecting said common element with said latching means for causing said latching means to take effect by movement of the common element from a first position to a second position without affecting the valve, means operatively connecting said common element with said valve for causing said valve to open by movement of the common element from said second position to a third position without releasing said latching means.

4. As an article of manufacture, a pipe-coupling socket member adapted to receive a complementary nozzle-like plug member and comprising detent elements each adapted to engage a recess in the plug member, a movable detent controlling member, operative connections between said member and said detent elements adapted to limit variably the depth of engagement of the elements in said recess and means for selectively locating the movable member in three positions, said operative connections including lost-motion means whereby in the first such position the said elements do not engage said recess, but in the second and third such positions the connections are operative to effect the engagement of the elements in said recess partially and completely respectively.

5. As an article of manufacture, a pipe-coupling socket member as claimed in claim 4 including spring-loaded toggle linkages carrying said elements and lost-motion means connecting said movable member to said toggle linkages, allowing said elements to be sprung radially outwards and further including a control lever for displacing said movable member axially of the socket-member, said control lever being pivoted on the socket member, a ratchet having three notches mounted on the socket member, and a spring-loaded pawl engageable with any one of said notches mounted on said control lever, said movable member being a ring embracing the socket member, and said lost-motion means comprising links pivoted on said movable member and having pin and slot connections with said toggle-linkages.

6. As an article of manufacture, a pipe-coupling socket member as claimed in claim 4 including a control lever for displacing said movable member axially of the socket member, said control lever being pivoted on the socket member, a ratchet having three notches mounted on the socket member, and a spring-loaded pawl engageable with any one of said notches mounted on said control lever, and further including a valve-opening member adapted to co-operate with a valve in a complementary plug member, said valve-opening member being pivotally mounted in the socket-member, an external lever rigidly connected with said valve-opening member and engageable by said control lever and movable thereby, when displacing said movable member from said second to said third position, to move said valve-opening member towards the mouth of the socket member, thereby enabling it, when the plug member is engaged in the socket member, to unseat the valve in said plug member, said valve-opening member being spring-biased to non-operative position.

7. A pipe-coupling assembly comprising, a pipe-coupling socket member adapted to receive a complementary nozzle-like plug member and comprising detent elements each adapted to engage a recess in the plug member, a movable detent controlling member, operative connections between said member and said detent elements adapted to limit variably the depth of engagement of the elements in said recess and means for selectively locating the movable member in three positions, said operative connections including lost-motion means whereby in the first such position the said elements do not engage said recess, but in the second and third such positions the connections are operative to effect the engagement of the elements in said recess partially and completely respectively, a nozzle-like plug member, which comprises a valve normally held on its seating by spring means, the socket member including a movable valve-opening member and lost-motion means operatively connecting said valve-opening member with said movable member, whereby said valve-opening member is caused to unseat said valve when said movable member is moved from said second to said third position.

8. A pipe-coupling assembly as claimed in claim 7, in which said valve comprises a main valve member seatable on the inside of the mouth of the plug member and a pressure-relief valve member seatable on a central opening of the main valve member, said opening communicating with the interior of the plug member, both said valve members being normally held on their seatings by a spring means, and said movable valve-opening member being operative first to unseat said relief valve member and thereafter to unseat said main valve member.

9. A pipe coupling assembly as set forth in claim 8 in which said plug member has a mouth, said main valve member is seatable on the inside of said mouth and has a central opening communicating with the interior of the plug member, a pressure-relief valve member is seatable on the inside of said opening, and spring means is provided reacting on a fixed abutment in said plug member and operative to seat said relief valve member and thereby seat said main valve member.

10. A pipe-coupling assembly comprising a socket member and a nozzle-like plug member snugly insertable in the socket member and provided with an external annular groove, a valve seating on the inside of the mouth of said plug member, a valve axially slidable in said plug member, spring means tending to seat said valve on said seating, toggle linkages each comprising a lever pivoted on the socket member and carrying a roller engageable in said groove, a telescopic link pivoted to the socket member and to said lever, and spring means tending to extend said telescopic link, a yoke-lever trunnion-mounted on the socket member, a ring loosely embracing the socket member and pivoted to said yoke-lever on an axis parallel to the trunnion axis, toggle-controlling links pivoted on said ring, each such link having pin and slot connection with one of said toggle linkages, a ratchet with three notches mounted on the socket member, a spring loaded pawl on said yoke lever engageable in any one of said notches, manual means for releasing said pawl from such notches, the arrangement being such that when the pawl is in the third notch the toggle-controlling links allow said rollers to engage fully in said groove, when the pawl is in the second notch the toggle-controlling links allow the rollers to engage only partially in the groove and when the pawl is in the first notch the toggle-controlling links prevent the rollers from engaging in the groove at all, a shaft journalled in the socket member carrying a finger situated inside the socket member and engageable with said valve to unseat it and an external lever engageable by said yoke-lever and movable thereby to cause said finger to unseat said valve when said pawl is moved from the second to the third of said notches, and spring means operative to return said finger to a position allowing said valve to be seated.

11. A pipe-coupling assembly as claimed in claim 10, in which said valve comprises a main valve member seatable on the inside of the mouth of the plug member and having a central opening communicating with the interior of the plug member, said main valve member being slidable on a spider fixed in the plug member, a pressure-relief valve member slidable in the main valve member and seatable on the inside of said opening, and in which said finger engages the relief valve member through said opening to unseat it, both the main and relief valve members being returnable to their seatings by spring means trapped between the spider and the relief valve member, and the relief valve when unseated by said finger engaging the main valve member, thereby to unseat the main valve member.

References Cited in the file of this patent

UNITED STATES PATENTS

| | | |
|---|---|---|
| 879,880 | Landan | Feb. 25, 1908 |
| 1,166,584 | Estep | Jan. 4, 1916 |
| 2,384,628 | Krone et al. | Sept. 11, 1945 |
| 2,733,079 | Worlidge | Jan. 31, 1956 |
| 2,770,474 | Krapp | Nov. 13, 1956 |